US011564017B2

(12) United States Patent
Pierre

(10) Patent No.: US 11,564,017 B2
(45) Date of Patent: Jan. 24, 2023

(54) INTERACTIVE APPLICATION SERVER ON A SECOND SCREEN DEVICE

(71) Applicant: OpenTV, Inc., San Francisco, CA (US)

(72) Inventor: Ludovic Pierre, Mountain View, CA (US)

(73) Assignee: OPENTV, INC., San Francisco, CA (US)

( * ) Notice: Subject to any disclaimer, the term of this patent is extended or adjusted under 35 U.S.C. 154(b) by 0 days.

(21) Appl. No.: 16/698,265

(22) Filed: Nov. 27, 2019

(65) Prior Publication Data
US 2020/0177970 A1 Jun. 4, 2020

Related U.S. Application Data

(63) Continuation of application No. 14/976,410, filed on Dec. 21, 2015, now Pat. No. 10,542,327.

(51) Int. Cl.
*H04N 21/81* (2011.01)
*H04N 21/431* (2011.01)
(Continued)

(52) U.S. Cl.
CPC ..... *H04N 21/8166* (2013.01); *A63F 13/2145* (2014.09); *A63F 13/31* (2014.09);
(Continued)

(58) Field of Classification Search
CPC .......... H04N 21/8166; H04N 21/4126; H04N 21/4312; H04N 21/43615; H04N 21/4781;
(Continued)

(56) References Cited

U.S. PATENT DOCUMENTS 10,542,327 B2  1/2020 Pierre
2003/0153374 A1  8/2003 Gilmore
(Continued)

FOREIGN PATENT DOCUMENTS

WO   1997/29458   8/1997
WO   2011/053271  5/2011

OTHER PUBLICATIONS

International Search Report and Written Opinion for PCT App No. PCT/US2016/067010 dated Mar. 6, 2017, 17 pgs.
(Continued)

*Primary Examiner* — Randy A Flynn
(74) *Attorney, Agent, or Firm* — Polsinelli LLP

(57) ABSTRACT

A server version of an interactive application executed by a processing device of a first mobile device communicatively connected to a main video rendering device collects first data generated by a first client version of the interactive application executed by the processing device. The server version of the interactive application generates first displayable content relating to the first client version of the interactive application based on the first data, wherein the first displayable content is rendered on a display of the first mobile device. The server version of the interactive application generates second displayable content based in part on the first data and additional data relating to the server version of the interactive application, wherein the first displayable content is different from the second displayable content. The server version of the interactive application, transmits the second displayable content to the main video rendering device to be rendered on a main video display.

20 Claims, 4 Drawing Sheets

(51) Int. Cl.
| | |
|---|---|
| *H04N 21/61* | (2011.01) |
| *H04N 21/436* | (2011.01) |
| *H04L 65/1059* | (2022.01) |
| *A63F 13/327* | (2014.01) |
| *H04N 21/478* | (2011.01) |
| *A63F 13/2145* | (2014.01) |
| *A63F 13/31* | (2014.01) |
| *H04L 67/025* | (2022.01) |
| *H04L 65/1083* | (2022.01) |
| *H04M 1/72427* | (2021.01) |
| *H04N 21/41* | (2011.01) |
| *H04L 65/612* | (2022.01) |
| *A63F 13/26* | (2014.01) |
| *A63F 13/323* | (2014.01) |

(52) U.S. Cl.
CPC ........ *A63F 13/327* (2014.09); *H04L 65/1059* (2013.01); *H04L 65/1083* (2013.01); *H04L 65/612* (2022.05); *H04L 67/025* (2013.01); *H04M 1/72427* (2021.01); *H04N 21/41265* (2020.08); *H04N 21/4312* (2013.01); *H04N 21/43615* (2013.01); *H04N 21/4781* (2013.01); *H04N 21/6125* (2013.01); *H04N 21/8173* (2013.01); *A63F 13/26* (2014.09); *A63F 13/323* (2014.09); *A63F 2300/538* (2013.01)

(58) Field of Classification Search
CPC ............ H04N 21/6125; H04N 21/8173; A63F 13/2145; A63F 13/31; A63F 13/327; A63F 13/26; A63F 13/323; A63F 2300/538; H04L 65/1059; H04L 65/1083; H04L 65/4084; H04L 67/025; H04M 1/72544
See application file for complete search history.

(56) References Cited

U.S. PATENT DOCUMENTS

| | | | | |
|---|---|---|---|---|
| 2008/0016175 | A1* | 1/2008 | Glazberg | ................ H04L 67/38 709/208 |
| 2010/0331082 | A1 | 12/2010 | Kim et al. | |
| 2011/0086631 | A1 | 4/2011 | Park et al. | |
| 2011/0197229 | A1 | 8/2011 | Yassa | |
| 2011/0265018 | A1 | 10/2011 | Borst | |
| 2011/0269508 | A1* | 11/2011 | Libault | .............. H04N 21/4314 455/566 |
| 2011/0296468 | A1 | 12/2011 | Pettit | |
| 2011/0319173 | A1 | 12/2011 | Backer | |
| 2012/0017236 | A1 | 1/2012 | Stafford | |
| 2012/0198084 | A1* | 8/2012 | Keskitalo | .......... H04L 29/08621 709/228 |
| 2013/0179928 | A1 | 7/2013 | Nagata | |
| 2013/0183021 | A1 | 7/2013 | Osman | |
| 2013/0263185 | A1 | 10/2013 | Wood | |
| 2014/0006474 | A1 | 1/2014 | White | |
| 2014/0007187 | A1 | 1/2014 | Harrison | |
| 2014/0108614 | A1 | 4/2014 | Gunderson | |
| 2014/0165112 | A1 | 6/2014 | Freeman | |
| 2014/0195912 | A1 | 7/2014 | Odorovic | |
| 2014/0229971 | A1* | 8/2014 | Noland | .............. H04N 21/2668 725/30 |
| 2014/0359057 | A1 | 12/2014 | Hensgen | |
| 2014/0380167 | A1 | 12/2014 | Bloch | |
| 2015/0074826 | A1* | 3/2015 | Shuto | ............... H04N 21/41407 726/28 |
| 2015/0089222 | A1 | 3/2015 | White | |
| 2015/0195620 | A1 | 7/2015 | Buchner | |
| 2015/0264408 | A1* | 9/2015 | Hao | ................... H04N 21/4334 725/23 |
| 2015/0339274 | A1 | 11/2015 | Pappu | |
| 2016/0044361 | A1 | 2/2016 | Delpuch et al. | |
| 2016/0226999 | A1 | 8/2016 | Johnsen | |

OTHER PUBLICATIONS

Chromecast—Google Cast Gaming UX Mockup Guidelines, Dec. 3, 2015, 35 pgs., retrieved Feb. 22, 2017 [online] URL : //developers. google.com/cast/downloads/GoogleCastGameUXguidelines-v201512- 03.pdf.

Harris, R., New Google Cast Remote Display Plugin for Unity Game Developers, App Developer Magazine, Dec. 7, 2015, 4 pgs., retrieved Feb. 23, 2017, [online] URL: appdevelopermagazine.com/3420/2015/12/7/New-Google-Cast-Remote-Display-Pl- ugin-for-Unity-Game-Developers/.

Milosevic, M., One Implementation of Companion Screen Functionality for Hybrid Broadcast Broadband Television, 23rd Telecommunications Forum TELFOR 2015, IEEE, Belgrade, Serbia, Nov. 24-26, 2015, pp. 783-786.

Nguyen, L., DIAL—Discovery and Launch Protocol Specification, Netflix, Inc., 2014, Version 1.7.1, 30 pgs., retrieved Feb. 21, 2017 [online] URL: //www.dial-multiscreen.org/dial-protocol-specification/DIAL-2ndScreenProt- ocol-1.7.1.pdf.

Non-Final Office Action dated Jan. 17, 2017 for U.S. Appl. No. 14/976,410; 17 pages.

Non-Final Office Action dated Feb. 22, 2018 for U.S. Appl. No. 14/976,410; 19 pages.

Non-Final Office Action dated Apr. 2, 2019 for U.S. Appl. No. 14/976,410; 21 pages.

Final Office Action dated Sep. 20, 2017 for U.S. Appl. No. 14/976,410; 27 pages.

Final Office Action dated Aug. 28, 2018 for U.S. Appl. No. 14/976,410; 24 pages.

Notice of Allowance dated Sep. 5, 2019 for U.S. Appl. No. 14/976,410; 8 pages.

\* cited by examiner

INTERACTIVE APPLICATION SERVER ON A SECOND SCREEN DEVICE

CROSS-REFERENCES TO RELATED APPLICATIONS

This application is a continuation of U.S. patent application Ser. No. 14/976,410 filed Dec. 21, 2015, which is hereby incorporated by reference in its entirety.

TECHNICAL FIELD

The present disclosure is related to television systems, and more particularly, to a first mobile device operable to execute an interactive application server to control the operation of a plurality of interactive application clients residing on corresponding second mobile devices without an intervening set-top box.

BACKGROUND

A television screen in a home may be used for various purposes, including, but not limited to, watching traditional televisions programs. The television's display may also be employed, for example, as a stand-alone monitor to display information retrieved from the Internet, to view still images or video, or to play interactive games. When employed as a display for receiving and transmitting data over the Internet, the television display may be connected to a computing device having the capability to run various applications such as Facebook™, Twitter™, etc.

When employed to play an interactive game, the television display may be employed as a common panel (or game board) for sharing information, and individual members of the household each employ a separate mobile device to participate in the interactive game (e.g., while keeping some information hidden from other players on their own separate screen). Each separate mobile device may include a display for representing the respective participant. Examples of interactive games may include, for example, card games, board games, quiz games, a sporting event waging game, etc. The separate mobile device may be a portable device or a remote control device to interact with the game. One example of such a configuration of an interactive game console is the Wii video game console in which the remote control device comprises various sensors (e.g., accelerometer) to produce an entertainment experience.

Unfortunately, interactive games employing mobile devices controlled by a main set top box console have limited availability because the main set top box console may be specific to the company that manufactures the main set top box console that deploys the interactive game. This creates a barrier of entry for game developers—it is easy and cost effective for game developers to focus on such a specific mobile device (e.g., an Android-based device, a windows-based device, an iOS-based device, etc.). Alternatively, a TV network operator may develop second screen interactive game software and hardware, but a TV network operator may not have the focus (nor the financial motivation) to address these problems that are more in the realm of game development companies.

DETAILED DESCRIPTION

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Figure 1:
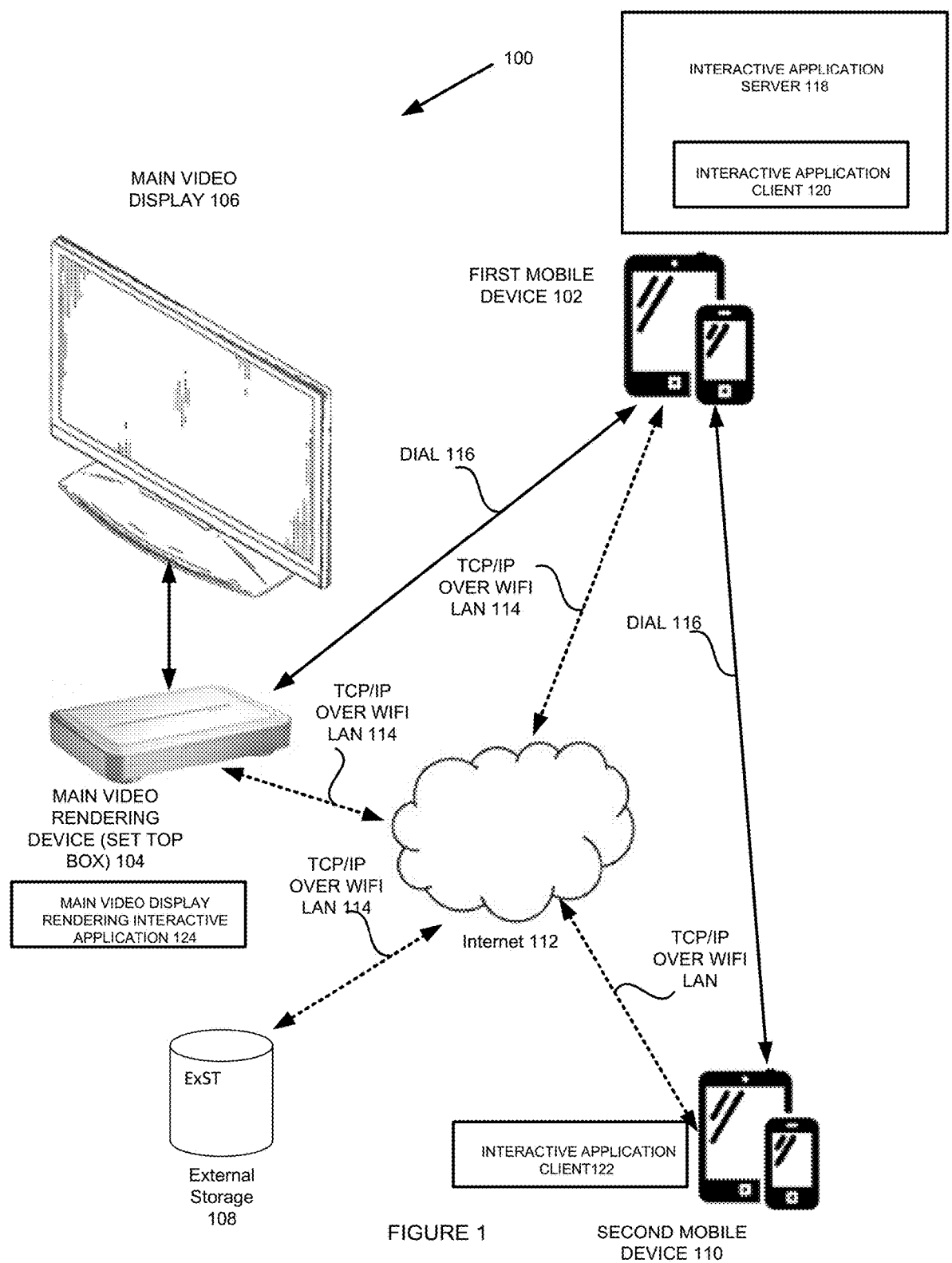
FIG. 1 is a block diagram that illustrates an example network including application modules associates with devices in the network as well as communication paths and protocols, in which examples of the present disclosure may operate.

FIG. 1 is a block diagram that illustrates an example network 100 including application modules associates with devices in the network 100 as well as communication paths and protocols, in which examples of the present disclosure may operate. Referring to FIG. 1, the network 100 may include a first mobile device 102 provided with a processing device (not shown) configured to execute code that may include a server version of an interactive application (hereinafter "the interactive application server 118") as well as a first client version of the interactive application (hereinafter "the interactive application client 120"). In an example, the first mobile device 102 may be a smartphone executing one of an Android, iOS, or Windows operating system, or a gaming console having a screen interface. The terms "computer", "computer platform", processing device, host, server are intended to include any data processing device, such as a desktop computer, a laptop computer, a tablet computer, a mainframe computer, a server, a handheld device, a digital signal processor (DSP), an embedded processor (an example of which is described in connection with FIG. 4), or any other device able to process data. The computer/computer platform is configured to include one or more microprocessors communicatively connected to one or more non-transitory computer-readable media and one or more networks. The term "communicatively connected" is intended to include any type of connection, whether wired or wireless, in which data may be communicated. The term "communicatively connected" is intended to include, but not limited to, a connection between devices and/or programs within a single computer or between devices and/or separate computers over a network. The term "network" is intended to include, but not limited to, OTA (over-the-air transmission, ATSC, DVB-T), packet-switched networks (TCP/IP, e.g., the Internet), satellite (microwave, MPEG transport stream or IP), direct broadcast satellite, analog cable transmission systems (RF), and digital video transmission systems (ATSC, HD-SDI, HDMI, DVI, VGA), etc.

The first mobile device 102 may be configured to employ the interactive application server 118 to manage the state of a multi-device interactive application, receive the interactive data from a user interface of the first mobile device 102, and receive interactive data from one or more communicatively connected second mobile devices 110 configured to store and execute code of a second client version of the interactive application (hereinafter "the interactive application client 122"). In an example, the one or more second mobile devices 110 may each be a smartphone executing one of an Android, iOS, or Windows operating system, or a gaming console having a screen interface.

The interactive application server 118 further permits the first mobile device 102 to be configured to play the role of an initiator by employing the interactive application server 118 to send a trigger message to the main video display rendering interactive application 124 executed by a main video rendering device 104 to render a displayable portion of the interactive application on a main video display 106 (e.g., a television or a monitor).

The main video rendering device 104 may be a multimedia receiving device such as a set-top box, a personal computer, a home network controller, or a dedicated module to handle video streams (e.g., a USB dongle connected to the main video display 106). This main video rendering device 104 may have access to the main video display 106 via, for example, a High-Definition Multimedia Interface (HDMI). In other examples, the main video rendering device 104 may be communicatively connected to the main video display 106 using a wireless or coaxial cable interface (e.g., Ethernet). The main video rendering device 104 may be communicatively connected to the first mobile device 102, the one or more second mobile devices 110, and an external storage server 108 that employs a TCP/IP over a WiFi local area network 114 using the Internet 112. The main video rendering device 104 may be further communicatively connected to the first mobile device 102 and the one or more second mobile devices 110 using the industry standard wireless Discovery And Launch (DIAL) protocol interface 116. The main video rendering device 104 may be provided with a processing device (not shown) configured to execute code to process the audio and video data received through various communication channels such as cable, antenna, or via the local area network 114.

The protocol used to launch a displayable part of the interactive application on the main video display 106 communicatively connected to the video rendering device 104 may be the industry-standard DIAL protocol. Accordingly, the main video display rendering interactive application 124 executed by a main video rendering device 104 may be further configured to execute a DIAL server that exposes a dummy application that is used to launch other applications using a URL passed from the first mobile device 102 (the initiator). DIAL is a mechanism for discovering and launching applications on a single subnet, typically a home network. It relies on Universal Plug and Play (UPnP), Simple Service Discovery Protocol (SSDP), and HTTP protocols. The protocol works without requiring a pairing between devices.

The trigger message transmitted by the first mobile device 102 to the main video display rendering interactive application 124 executed by a main video rendering device 104 (e.g., a set-top box, a personal computer, a home network controller, a USB dongle, etc.) may comprise a universal resource locator (URL) that may point to the first mobile device 102 (in which case the first mobile device 102 may be configured to embed the code to run on the main video rendering device 104) or to the external storage server 108 found on the Internet 112. Once launched, the main video display rendering interactive application 124 may be configured to identify the IP address of the first mobile device 102 (initiator) or a storage server (not shown) associated with the first mobile device 102 (initiator) and may interact with it to display game status, the game board, etc.

When the URL points to the first mobile device 102 (initiator), the first mobile device 102 may store the frames ready to be transmitted to the main video rendering device 104. Accordingly, the first mobile device 102 (initiator) may play the role of a video transmitter for the video rendering device 104.

Stopping the main video display rendering interactive application 124 on the main video rendering device 104 may rely on DIAL protocol's standard mechanism. The one or more second mobile devices 110 may join the interactive application currently managed by the first mobile device 102. For that purpose, the one or more second mobile devices 110 execute the interactive application client 122 which participates in the interactive application in a dependent mode.

The first mobile device 102 may then invite or be joined by the one or more second mobile devices 110 to participate in the multi-device interactive application. The first mobile device 102 and the one or more second mobile devices 110 may share the same network (e.g., share the same router) with the main video rendering device 104 using the TCP/IP over WiFi local area network 114 using the Internet 112.

Data produced by the multi-device interactive applications may be the resulting data produced by interactions between the interactive application client 120 running on the first mobile device 102, the interactive application client 122 running of the one or more second mobile devices 110, and the interactive application server 118 running on the first mobile device 102.

Data produced by the multi-device interactive application may further be the resulting data produced by correlating the data produced by the interactive application client 122 running on the first mobile device 102 and the interactive application client 120 running of the one or more second mobile devices 110 by the interactive application server 118 running on the first mobile device 102 to produce a main display and data for the main display of the multi-device interactive application to be transmitted to the main video rendering device 104 and displayed on the main video display 106 communicatively connected to the main video rendering device 104.

The interactive application server 118 and the interactive application clients 120, 122 are similar applications, they differ from each other in that the interactive application server 118 also plays the server role and process the data received from one or more second mobile devices 110 so as to form the interactive application.

The interactive application server 118 may provide to the interactive application client 122 of the one or more second mobile devices 110 a list the interactive application sessions available. Each session may be identified by a free text, describing the session as well as metadata used to obtain the data of interactive application client 122 by the one or more second mobile devices 110.

The one or more second mobile devices 110, once connected with the first mobile device 102, may receive information about the interactive application sessions available on the first mobile device 102. One or more users associated with the corresponding one or more second mobile devices 110 may select one interactive application session and can send a request to join this session.

The first mobile device 102 may display a notification on its own screen informing the user about the participation of another user to the multi-device interactive application session. The user of the first mobile device 102 may grant or deny access to the interactive application session (e.g., parental control) and decide to start the session when enough participants have joined (e.g. a game that requires exactly 4 players).

Optionally, when the interactive application client 122 is not already present in the one or more second mobile devices 110, the first mobile device 102 may transmit metadata to the one or more second mobile devices 110 to permit the one or more second mobile devices 110 to download the interactive application client 122 into its memory. This metadata may comprise a link to a remote an external storage server 108 accessible via the Internet 112, such as web server, to download the interactive application client 122. The one or more second mobile devices 110 may request the download of the interactive application client 122 to the web server using the address contained in the metadata.

In another example, the metadata may provide a link to a storage device (not shown) associated with the main video rendering device 104. The one or more second mobile devices 110 may access the main video rendering device 104 storage device and request the download of the interactive application client 122 using the address contained in the metadata.

In another example, the first mobile device 102 may contain the interactive application client 120, 122 stored in its memory. The one or more second mobile devices 110 may request the download of the interactive application client 120, 122 from the first mobile device 102.

Once the interactive application client 120, 122 is loaded into the one or more second mobile devices 110 the one or more second mobile devices 110 may start the interactive application client 122. The interaction of the user of the one or more second mobile devices 110 with the interactive application client 122 may be transmitted to the is transmitted to the first mobile device 102. The interactive application server 118 processes the received data with the results of the interaction of its own interactive application client 120 in order to produce the displayable part of the interactive application.

When the one or more second mobile devices 110 is available and/or requests to participate in the interactive experience, it sends a notification to the first mobile device 102. The video rendering device 104 does not need to have the specific application loaded since it comprises only a generic interpreter common to all specific applications. The main video display rendering interactive application 124 executed by a video rendering device 104 may interpret a protocol (e.g. the DIAL protocol) common to a plurality of specific applications. This is why it is not necessary to install into the video rendering device 104 the interactive application server 118 and/or the interactive application client 120, 122 loaded into the first mobile device 102 and the one or more second mobile devices 110.

An auxiliary device such as a tablet can retrieve the displayable part of the main video display rendering interactive application 124 executed by a main video rendering device 104, in addition the video rendering device 104. The tablet may receive the trigger message in the same manner as the main video rendering device 104 and may retrieve the displayable part of the main video display rendering interactive application 124 using the link provided in the trigger message.

Figure 2:
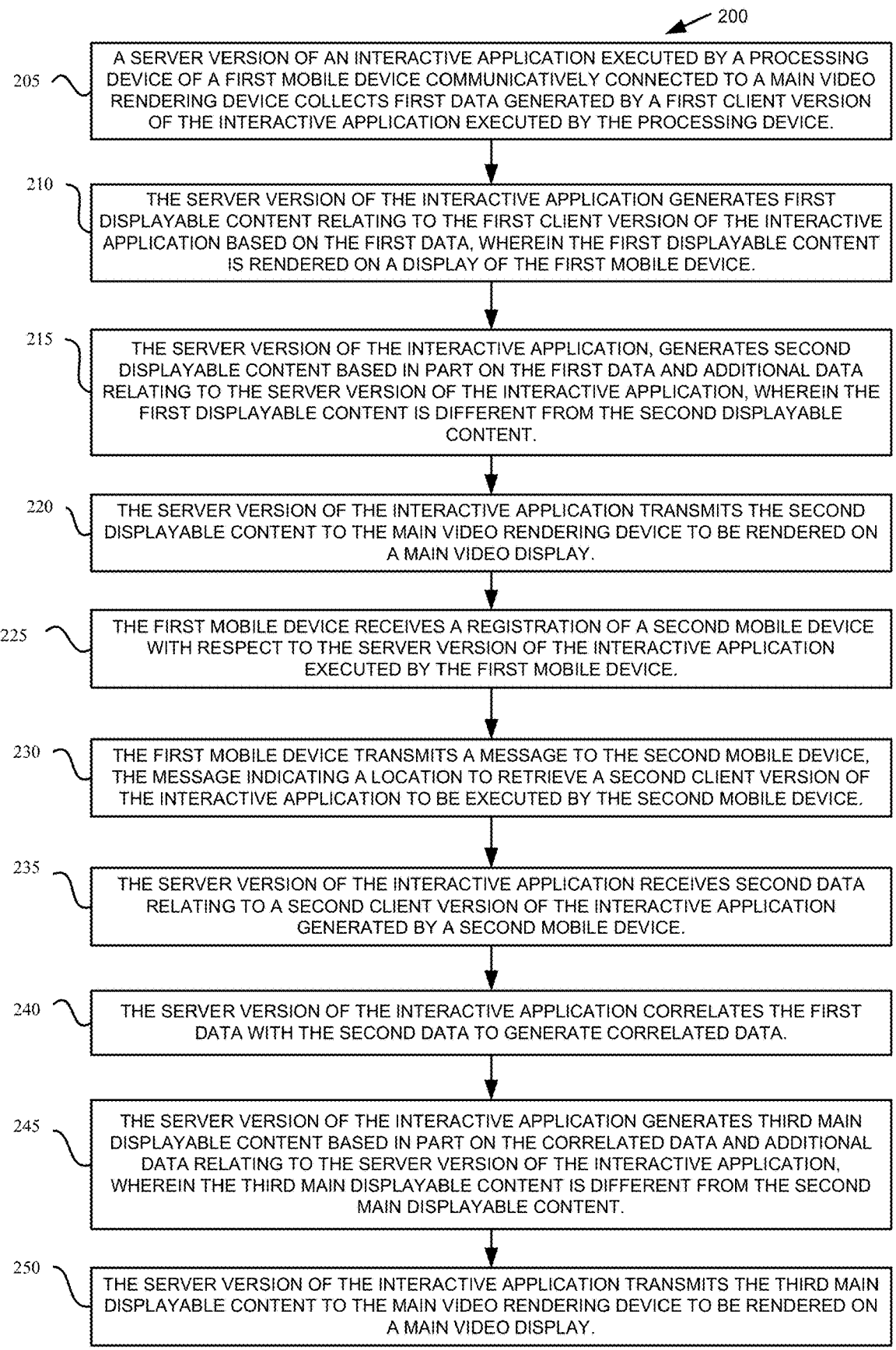
FIG. 2 is a diagram illustrating an exemplary method to permit a first mobile device to execute code that may include an interactive application server that interacts alone with an interactive application client residing on the first mobile device to run on a main video display rendering interactive application executed by a main video rendering device for display on a main video display.

FIG. 2 is a diagram illustrating an exemplary method 200 to permit the first mobile device 102 to execute code that may include an interactive application server 118 that interacts alone with a first interactive application client 120 residing on the first mobile device 102 to run on the main video display rendering interactive application 124 executed by a main video rendering device 104 for display on the main video display 106. The method 200 may be performed primarily by the interactive application server 118 of the first mobile device 102 of FIG. 1 and may comprise hardware (e.g., circuitry, dedicated logic, programmable logic, microcode, etc.), software (e.g., instructions run on a processing device), or a combination thereof.

As shown in FIG. 2, at block 205, a server version of an interactive application (e.g., the interactive application server 118) executed by a processing device (not shown) of a first mobile device 102 communicatively connected to a main video rendering device 104 may collect first data generated by a first client version of the interactive application (e.g., the interactive application client 120) executed by the processing device. At block 210, the first mobile device 102 may transmit a message to a main video rendering device 104 associated with a main video display 106. The message may indicate a location to retrieve a main video screen rendering version of the interactive application 124. The location to retrieve the main video display rendering version of the interactive application (e.g., 124) may be one of a storage device associated with the main video rendering device 104, a remote storage device 108 accessible via the Internet or a local area network, or a storage device associated with the first mobile device 102. The server version of the interactive application (e.g., 118) may generate first displayable content relating to the first client version of the interactive application (e.g., 120) based on the first data, wherein the first displayable content is rendered on a display of the first mobile device 102.

At block 215, the server version of the interactive application (e.g., 118) may generate second displayable content based in part on the first data and additional data relating to the server version of the interactive application (e.g., 118), wherein the first displayable content is different from the second displayable content. At block 220, the server version of the interactive application (e.g., 118) may transmit the second displayable content to the main video rendering device 104 to be rendered on a main video display 106.

At block 225, the first mobile device 102 may receive a registration of a second mobile device 110 with respect to the server version of the interactive application (e.g., 118) executed by the first mobile device 102. At block 230, the first mobile device 102 may transmit a message to the second mobile device 110, the message indicating a location to retrieve a second client version of the interactive application to be executed by the second mobile device. The location for the second mobile device 110 to retrieve the second client version of the interactive application (e.g., 122) may be one of a storage device associated with the main video rendering device 104, a remote storage device 108 accessible via the Internet or a local area network, or a storage device associated with the first mobile device 102.

The registration of the second mobile device 110 may comprise a selection of an interactive application session from a list of available interactive application sessions. Responsive to the selection from the list of available interactive application sessions, the first mobile device 102 may grant or deny access to the selected interactive application session. The first mobile device 102 may send a notification to the second mobile device 110 indicating a decision to grant or deny access to the selected interactive application session.

At block 235, the server version of the interactive application (e.g., 118) may receive second data relating to a second client version of the interactive application (e.g., the interactive application client 122) generated by the second mobile device 110. At block 240, the server version of the interactive application (e.g., 118) may correlate the first data with the second data to generate correlated data. At block 245, the server version of the interactive application (e.g., 118) may generate third main displayable content based in part on the correlated data and additional data relating to the server version of the interactive application (e.g., 118), wherein the third main displayable content is different from the second main displayable content. At block 250, the server version of the interactive application (e.g., 118) may transmit the third main displayable content to the main video rendering device 104 to be rendered on a main video display 106.

In an example, the first mobile device 102 may transmit to the main video rendering device 104 commands to access one or more controls of the main video display 106. The first mobile device 102 may interact with the main video rendering device 104 using the Discovery And Launch (DIAL) protocol.

In an example, the first mobile device 102 may stop the main video display rendering version of the interactive application (e.g., 124) on the main video rendering device 106. Stopping may comprise the first mobile device 102 a command to remove the main video display rendering version of the interactive application (e.g., 124).

Figure 3:
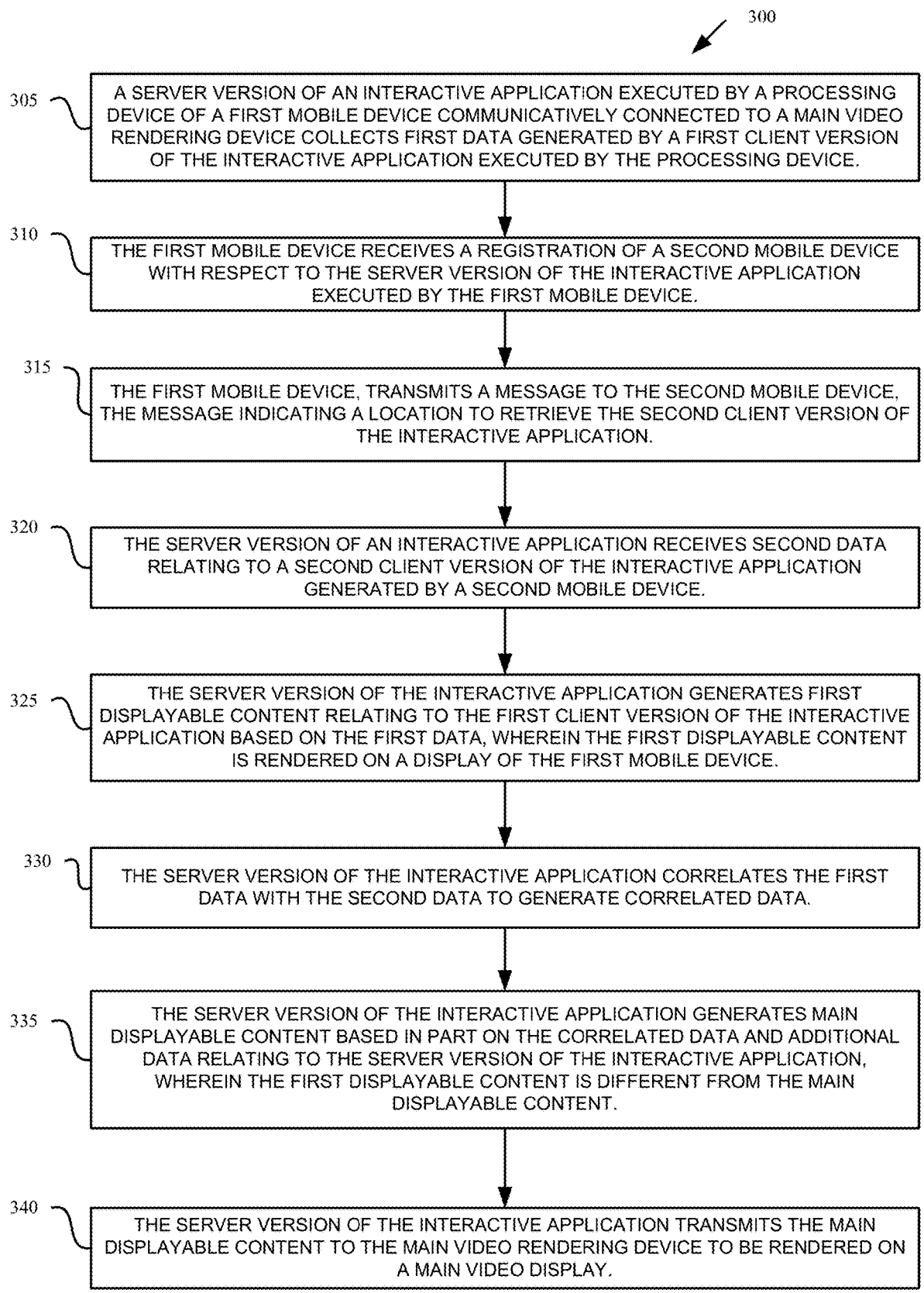
FIG. 3 is a diagram illustrating an exemplary method to permit the first mobile device to execute code that may include an interactive application server that interacts with an interactive application client residing on the first mobile device and an interactive application client residing on a second mobile device to run on a main video display rendering interactive application executed by a main video rendering device for display on the main video display.

FIG. 3 is a diagram illustrating an exemplary method 300 to permit the first mobile device 102 to execute code that may include an interactive application server 118 that interacts with an interactive application client 120 residing on the first mobile device 102 and an interactive application client 122 of the second mobile device 110 to run on the main video display rendering interactive application 124 executed by a main video rendering device 104 for display on the main video display 106. The method 300 may be performed primarily by the interactive application server 118 of the first mobile device 102 of FIG. 1 and may comprise hardware (e.g., circuitry, dedicated logic, programmable logic, microcode, etc.), software (e.g., instructions run on a processing device), or a combination thereof.

As shown in FIG. 3, at block 305, a server version of an interactive application (e.g., 118) executed by a processing device (not shown) of a first mobile device 102 communicatively connected to a main video rendering device 104 may collect first data generated by a first client version of the interactive application (e.g., 120) executed by the processing device.

At block 310, the first mobile device 102 may receive a registration of a second mobile device 110 with respect to the server version of the interactive application (e.g., 118) executed by the first mobile device 102. At block 315, the first mobile device 102 may transmit a message to the second mobile device 110, the message indicating a location to retrieve the second client version of the interactive application 122. The location for the second mobile device 110 to retrieve the second client version of the interactive application (e.g., 122) may be one of a storage device associated with the main video rendering device 104, a remote storage device 108 accessible via the Internet or a local area network, or a storage device associated with the first mobile device 102.

The registration of the second mobile device 110 may comprise a selection of an interactive application session from a list of available interactive application sessions. Responsive to the selection from the list of available interactive application sessions, the first mobile device 102 may grant or deny access to the selected interactive application session. The first mobile device 102 may send a notification to the second mobile device 110 indicating a decision to grant or deny access to the selected interactive application session.

At block 320, the server version of an interactive application (e.g., 118) may receive second data relating to a second client version of the interactive application (e.g., 122) generated by the second mobile device 104. At block 325, the server version of the interactive application (e.g., 118) may generate first displayable content relating to the first client version of the interactive application (e.g., 120) based on the first data, wherein the first displayable content may be rendered on a display of the first mobile device 102. At block 330, the server version of the interactive application (e.g., 118) may correlate the first data with the second data to generate correlated data. At block 335, the server version of the interactive application (e.g., 118) may generate main displayable content based in part on the correlated data and additional data relating to the server version of the interactive application (e.g., 118), wherein the first displayable content is different from the main displayable content. At block 340, the server version of the interactive application (e.g., 118) may transmit the main displayable content to the main video rendering device 104 to be rendered on a main video display 106.

In an example first client version of the interactive application (e.g., 120) may generate second displayable content for display on the second mobile device 110.

In an example, the first mobile device 102 may transmit to the main video rendering device 104 commands to access one or more controls of the main video display 106. The first mobile device 102 may interact with the main video rendering device 104 using the Discovery And Launch (DIAL) protocol.

In an example, the first mobile device 102 may stop the main video display rendering version of the interactive application (e.g., 124) on the main video rendering device 106. Stopping may comprise the first mobile device 102 a command to remove the main video display rendering version of the interactive application (e.g., 124).

Figure 4:
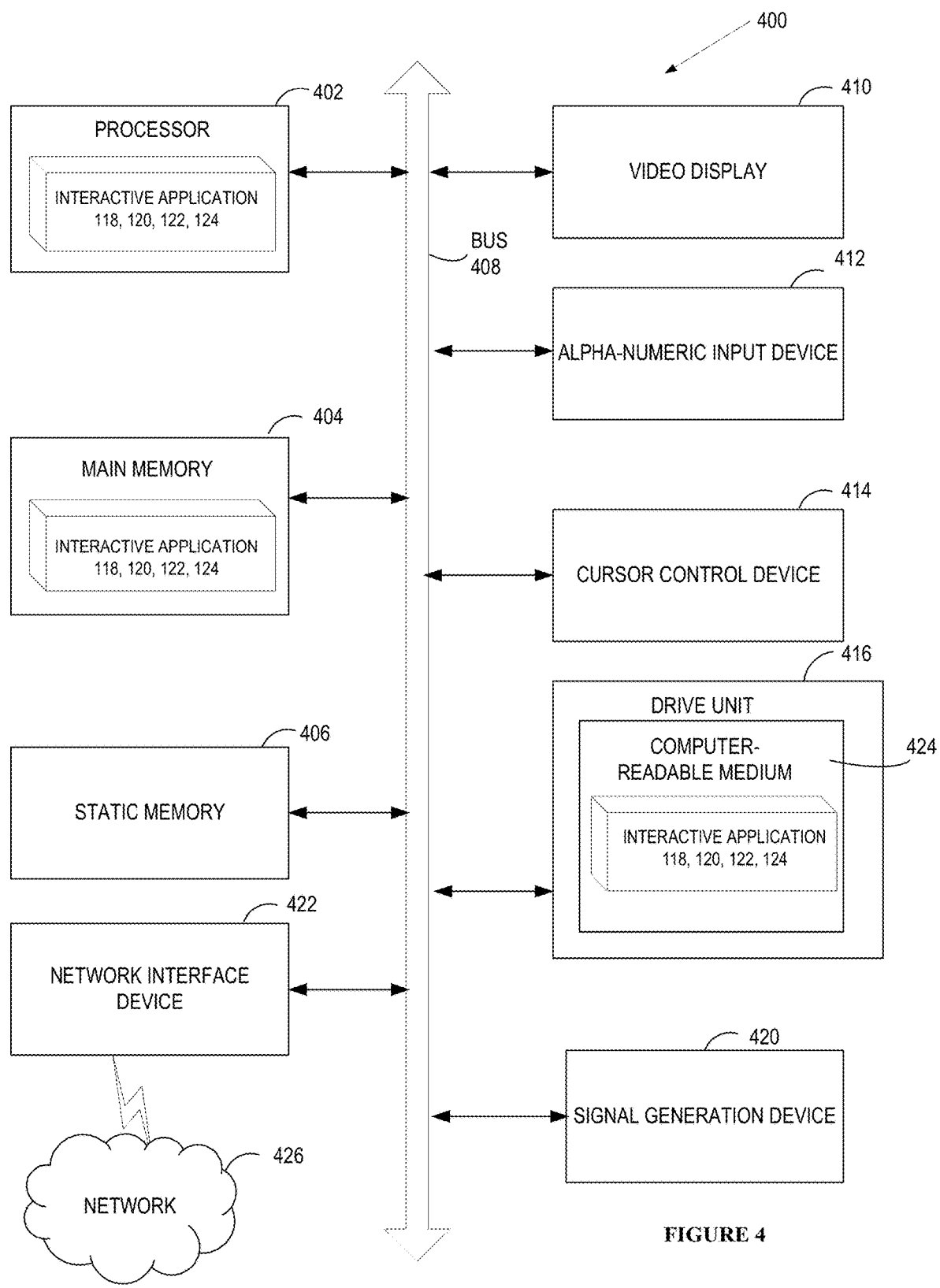
FIG. 4 illustrates a diagrammatic representation of a machine in the example form of a computer system within which a set of instructions, for causing the machine to perform any one or more of the methodologies discussed herein, may be executed.

FIG. 4 illustrates a diagrammatic representation of a machine in the example form of a computer system 400 within which a set of instructions, for causing the machine to perform any one or more of the methodologies discussed herein, may be executed. In some examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processing device (processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 416, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The interactive applications 118, 120, 122, 124 may be executed by processor 402 configured to perform the operations and steps discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

A drive unit 416 may include a computer-readable medium 424 on which is stored one or more sets of instructions (e.g., instructions of the interactive applications 118, 120, 122, 124) embodying any one or more of the methodologies or functions described herein. The instructions of the interactive applications interactive applications 118, 120, 122, 124 may also reside, completely or at least partially, within the main memory 404 and/or within the processor 402 during execution thereof by the computer system 400, the main memory 404 and the processor 402 also constituting computer-readable media. The instructions of the interactive applications interactive applications 118, 120, 122, 124 may further be transmitted or received over a network 426 via the network interface device 422.

While the computer-readable storage medium 424 is shown in an example to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The following examples pertain to further embodiments.

Example 1 is a method comprising collecting, by a server version of an interactive application executed by a processing device of a first mobile device communicatively connected to a main video rendering device, first data generated by a first client version of the interactive application executed by the processing device; generating, by the server version of the interactive application, first displayable content relating to the first client version of the interactive application based on the first data, wherein the first displayable content is rendered on a display of the first mobile device; generating, by the server version of the interactive application, second displayable content based in part on the first data and additional data relating to the server version of the interactive application, wherein the first displayable content is different from the second displayable content; and transmitting, by the server version of the interactive application, the second displayable content to the main video rendering device to be rendered on a main video display.

Example 2 may optionally extend the subject matter of example 1. In example 2, the method may further comprise transmitting, by the server version of the interactive application, a message to the main video rendering device associated with the main video display, the message indicating a location to retrieve a main video display rendering version of the interactive application.

Example 3 may optionally extend the subject matter of any of examples 1-2. In example 3, the location to retrieve the main video display rendering version of the interactive application is one of a storage device associated with the video rendering device, a remote storage device accessible via the Internet or a local area network, or a storage device associated with the first mobile device.

Example 4 may optionally extend the subject matter of any of examples 1-3. In example 4, the method may further receiving, by the first mobile device, a registration of a second mobile device with respect to the server version of the interactive application executed by the first mobile device; and transmitting, by the first mobile device, a message to the second mobile device, the message indicating a location to retrieve a second client version of the interactive application to be executed by the second mobile device.

Example 5 may optionally extend the subject matter of example 4. In example 5 the location for the second mobile device to retrieve the second client version of the interactive application is one of a storage device associated with the video rendering device, a remote storage device accessible via the Internet or a local area network, or a storage device associated with the first mobile device.

Example 6 may optionally extend the subject matter of example 3. In example 6, the registration of the second mobile device comprises a selection of an interactive application session from a list of available interactive application sessions.

Example 7 may optionally extend the subject matter of example 6. In example 7, responsive to the selection from the list of available interactive application sessions, the first mobile device grants or denies access to the selected interactive application session.

Example 8 may optionally extend the subject matter of example 7. In example 8, the method may further comprise sending a notification, by the first mobile device to the second mobile device, indicating a decision to grant or deny access to the selected interactive application session.

Example 9 may optionally extend the subject matter of any of examples 1-8. In example 9, the method may further comprise receiving, by the server version of the interactive application, second data relating to a second client version of the interactive application generated by a second mobile device; correlating, by the server version of the interactive application, the first data with the second data to generate correlated data; generating, by the server version of the interactive application, third main displayable content based in part on the correlated data and additional data relating to the server version of the interactive application, wherein the third main displayable content is different from the second main displayable content; and transmitting, by the server version of the interactive application, the third main displayable content to the main video rendering device to be rendered on a main video display.

Example 10 may optionally extend the subject matter of any of examples 1-9. In example 10, the method may further comprise transmitting commands, by the first mobile device to the main video rendering device, to access one or more controls of the main video display.

Example 11 may optionally extend the subject matter of any of examples 1-10. In example 11, the first mobile device interacts with the main video rendering device using the Discovery And Launch (DIAL) protocol.

Example 12 may optionally extend the subject matter of any of examples 1-11. In example 12, the method may further comprise comprising stopping, by the first mobile device, the main video display rendering version of the interactive application on the main video rendering device.

Example 13 may optionally extend the subject matter of example 12. In example 13, stopping the interactive application on main video display rendering version of the interactive application on the main video rendering device comprises a command to remove the main video display rendering version of the interactive application.

Example 14 is a system comprising a memory to store instructions; and a processing device of a first mobile device communicatively connected to a main video rendering device and operatively coupled to the memory, the processing device to: collect, by a server version of an interactive application executed by the processing device of a first mobile device communicatively connected to a main video rendering device, first data generated by a first client version of the interactive application executed by the processing device; generate, by the server version of the interactive application, first displayable content relating to the first client version of the interactive application based on the first data, wherein the first displayable content is rendered on a display of the first mobile device; generate, by the server version of the interactive application, second displayable content based in part on the first data and additional data relating to the server version of the interactive application, wherein the first displayable content is different from the second displayable content; and transmit, by the server version of the interactive application, the second displayable content to the main video rendering device to be rendered on a main video display.

Example 15 is a method comprising collecting, by a server version of an interactive application executed by a processing device of a first mobile device communicatively connected to a main video rendering device, first data generated by a first client version of the interactive application executed by the processing device; receiving, by the server version of an interactive application, second data relating to a second client version of the interactive application generated by a second mobile device; generating, by the server version of the interactive application, first displayable content relating to the first client version of the interactive application based on the first data, wherein the first displayable content is rendered on a display of the first mobile device; correlating, by the server version of the interactive application, the first data with the second data to generate correlated data; generating, by the server version of the interactive application, main displayable content based in part on the correlated data and additional data relating to the server version of the interactive application, wherein the first displayable content is different from the main displayable content; and transmitting, by the server version of the interactive application, the main displayable content to the main video rendering device to be rendered on a main video display.

Example 16 may optionally extend the subject matter of example 15. In example 16, the method may further comprise generating, by the first client version of the interactive application, second displayable content for display on the second mobile device.

Example 17 may optionally extend the subject matter of any of examples 15. In example 17, the method may further before receiving the second data: receiving, by the first mobile device, a registration of a second mobile device with respect to the server version of the interactive application executed by the first mobile device; and transmitting, by the first mobile device, a message to the second mobile device, the message indicating a location to retrieve the second client version of the interactive application.

Example 18 may optionally extend the subject matter of example 17. In example 18, the location for the second mobile device to retrieve the second client version of the interactive application is one of a storage device associated with the video rendering device, a remote storage device accessible via the Internet or a local area network, or a storage device associated with the first mobile device.

Example 19 may optionally extend the subject matter of any of examples 17-18. In example 19, the registration of a secondary second screen device comprises a selection of an interactive application session from a list of available interactive application sessions.

Example 20 may optionally extend the subject matter example 19. In example 21, responsive to the selection from the list of available interactive application sessions, the first mobile device grants or denies access to the selected interactive application session.

Example 21 may optionally extend the subject matter example 19. In example 22, the method may further comprise sending a notification, by the first mobile device to the second mobile device, indicating a decision to grant or deny access to the selected interactive application session.

Example 22 may optionally extend the subject matter of any of examples 17-21. In example 22, the method may further comprise transmitting commands, by the first mobile device to the main video rendering device, to access one or more controls of the main video display.

Example 23 may optionally extend the subject matter of any of examples 17-22. In example 23, the first mobile device interacts with the video rendering device using the Discovery And Launch (DIAL) protocol.

Example 24 may optionally extend the subject matter of any of examples 17-23. In example 24, the method may further comprise stopping, by the first mobile device, the interactive application on the main video rendering device.

Example 25 may optionally extend the subject matter of example 24. In example 25, stopping the interactive application on the video rendering device comprises a command to remove the main video screen rendering version of the interactive application.

Example 26 is a system comprising a memory to store instructions; and a processing device of a first mobile device communicatively connected to a main video rendering device and operatively coupled to the memory, the processing device to: collect, by a server version of an interactive application executed by the processing device, first data generated by a first client version of the interactive application executed by the processing device; receive, by the server version of an interactive application, second data relating to a second client version of the interactive application generated by a second mobile device; generate, by the server version of the interactive application, first displayable content relating to the first client version of the interactive application based on the first data, wherein the first displayable content is rendered on a display of the first mobile device; correlate, by the server version of the interactive application, the first data with the second data to generate correlated data; generate, by the server version of the interactive application, main displayable content based in part on the correlated data and additional data relating to the server version of the interactive application, wherein the first displayable content is different from the main displayable content; and transmit, by the server version of the interactive application, the main displayable content to the main video rendering device to be rendered on a main video display.

In the above description, numerous details are set forth. It is apparent, however, to one of ordinary skill in the art having the benefit of this disclosure, that examples of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "writing", "maintaining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Examples of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Example structure for a variety of these systems appears from the description herein. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
   causing location information for obtaining a client version of an application to be provided to a second device;
   receiving a first message at a first handheld mobile device concurrently running both the client version and a server version of the application, the server version configured to receive data from the client version running on the first handheld mobile device, and data from a second device, the first message related to the second device and sent using a wireless connection;
   determining that the first message includes at least first information representing a selection of the client version of the application by the second device;
   determining by the server version of the application that the second device is authorized to access the client version of the application;
   sending, from the first handheld mobile device using the wireless connection, at least second information representing a grant of access to the client version of the application by the second device; and
   determining that the second device has accessed the client version of the application.

2. The method of claim 1, wherein the location information for obtaining the client version of the application represents at least one of an Internet address, a remote storage device, a storage device accessible over a local area network, and a storage device associated with the first handheld mobile device.

3. The method of claim 1, wherein the first handheld mobile device determines that the second device is authorized to access the client version of the application.

4. The method of claim 1, wherein the first handheld mobile device receives a user input indicating that the second device is authorized to access the client version of the application.

5. The method of claim 1, further comprising monitoring, by the first handheld mobile device, the access of the client version of the application by the second device.

6. The method of claim 1, further comprising, causing, by the first handheld mobile device, main content to be rendered on a main video rendering device.

7. The method of claim 1, further comprising, sending, by the first handheld mobile device, commands to access one or more controls on a main video rendering device.

8. The method of claim 1, further comprising, interacting with a main video rendering device using at least a Discovery and Launch (DIAL) protocol.

9. The method of claim 1, further comprising, causing, by the first handheld mobile device, a main video rendering device to stop rendering main content.

10. The method of claim 1, further comprising, sending, by the first handheld mobile device, a trigger message to a main video rendering device, the trigger message including at least a universal resource locator (URL).

11. A system comprising:
a memory to store instructions;
a wireless connection between a first handheld mobile device and a second device; and
a processing device of the first handheld mobile device that is operatively coupled to the memory, the processing device configured to:
receive a first message at the first handheld mobile device concurrently running both a client version and a server version of an application, the server version configured to receive data from the client version running on the first handheld mobile device, and data from the second device, the first message related to the second device and sent using the wireless connection;
determine that the first message includes at least first information representing a selection of a client version of the application by the second device;
determine by the server version of the application that the second device is authorized to access the client version of the application;
send, from the first handheld mobile device to the second device, at least second information representing location information for obtaining the client version of the application and a grant of access to the client version of the application by the second device; and
determine that the second device has accessed the client version of the application.

12. The system of claim 11, wherein the location information for obtaining the client version of the application represents at least one of an Internet address, a remote storage device, a storage device accessible over a local area network, and a storage device associated with the first handheld mobile device.

13. The system of claim 11, wherein the first handheld mobile device determines that the second device is authorized to access the client version of the application.

14. The system of claim 11, wherein the first handheld mobile device receives a user input indicating that the second device is authorized to access the client version of the application.

15. The system of claim 11, wherein the processing device is further configured to monitor, by the first handheld mobile device, the access of the client version of the application by the second device.

16. The system of claim 11, wherein the processing device is further configured to cause main content to be rendered on a main video rendering device.

17. The system of claim 11, wherein the processing device is further configured to send commands to access one or more controls on a main video rendering device.

18. The system of claim 11, wherein the processing device is further configured to interact with a main video rendering device using at least a Discovery and Launch (DIAL) protocol.

19. The system of claim 11, wherein the processing device is further configured to cause a main video rendering device to stop rendering main content.

20. The system of claim 11, wherein the processing device is further configured to send a trigger message to a main video rendering device, the trigger message including at least a universal resource locator (URL).

* * * * *